United States Patent
Agarwal et al.

(10) Patent No.: US 9,970,415 B2
(45) Date of Patent: May 15, 2018

(54) METHOD AND SYSTEM FOR MANAGING LOADS ON A WIND TURBINE

(71) Applicant: General Electric Company, Schenectady, NY (US)

(72) Inventors: Pranav Agarwal, Guilderland, NY (US); Jigar Jayesh Shah, Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 732 days.

(21) Appl. No.: 14/303,052

(22) Filed: Jun. 12, 2014

(65) Prior Publication Data

US 2015/0361960 A1    Dec. 17, 2015

(51) Int. Cl.
*F03D 7/04*    (2006.01)
*G05B 15/02*    (2006.01)
(Continued)

(52) U.S. Cl.
CPC ........... *F03D 7/045* (2013.01); *F03D 7/0224* (2013.01); *F03D 17/00* (2016.05); *G05B 15/02* (2013.01);
(Continued)

(58) Field of Classification Search
CPC ........ F03D 7/045; F03D 7/046; F03D 7/0212; F03D 7/0224; F03D 7/0272;
(Continued)

(56) References Cited

U.S. PATENT DOCUMENTS

| 5,289,041 A * | 2/1994 | Holley .................. F03D 7/0224 290/44 |
| 7,004,724 B2 | 2/2006 | Pierce et al. |

(Continued)

FOREIGN PATENT DOCUMENTS

| EP | 2302206 A1 | 3/2011 |
| EP | 2500562 A2 | 3/2012 |

(Continued)

OTHER PUBLICATIONS

European Search Report and Opinion issued in connection with corresponding EP Application No. 15170145.5 dated Oct. 27, 2015.

(Continued)

*Primary Examiner* — Richard Edgar
*Assistant Examiner* — John S Hunter
(74) *Attorney, Agent, or Firm* — Nitin N. Joshi

(57) ABSTRACT

A method and a system for managing loads on a wind turbine are provided. The computer-implemented method is implemented using a processor coupled to a memory device. The method includes determining a first moment of a wind load acting about a first axis of a rotor of the wind turbine, determining a second moment of a wind load acting about a second axis of a rotor of the wind turbine, and determining a resultant moment of the first moment and the second moment. The method also includes generating an error signal indicating a difference between the resultant moment and a predetermined moment level threshold signal and generating, by the processor, a first activation signal over a range of the generated error signal between a first zero activation signal level and a first full activation signal level.

12 Claims, 6 Drawing Sheets

(51) Int. Cl.
*F03D 7/02* (2006.01)
*F03D 17/00* (2016.01)

(52) U.S. Cl.
CPC ... *F05B 2260/74* (2013.01); *F05B 2270/1095* (2013.01); *F05B 2270/331* (2013.01); *F05B 2270/332* (2013.01); *F05B 2270/335* (2013.01); *Y02E 10/723* (2013.01)

(58) Field of Classification Search
CPC ............ F05B 2260/74; F05B 2270/328; F05B 2270/329; F05B 2270/404; G05B 15/02
See application file for complete search history.

(56) References Cited

U.S. PATENT DOCUMENTS

| | | |
|---|---|---|
| 7,160,083 B2 | 1/2007 | Pierce et al. |
| 7,891,944 B2 | 2/2011 | Jeppesen et al. |
| 8,222,760 B2 | 7/2012 | Menke |
| 8,240,990 B2 | 8/2012 | Kammer et al. |
| 8,261,599 B2 | 9/2012 | Jeffrey et al. |
| 8,360,722 B2 | 1/2013 | Hoffmann et al. |
| 8,398,369 B2 * | 3/2013 | Rebsdorf .............. F03D 7/0224 416/147 |
| 2009/0129924 A1 * | 5/2009 | Rebsdorf .............. F03D 7/0224 416/43 |
| 2012/0055247 A1 | 3/2012 | Gonzalez Castro |
| 2014/0037448 A1 | 2/2014 | Fu et al. |

FOREIGN PATENT DOCUMENTS

| | | |
|---|---|---|
| GB | 2484156 A | 4/2012 |
| WO | 2010016764 A1 | 2/2010 |
| WO | 2011023588 A2 | 3/2011 |
| WO | 2011023588 A3 | 3/2011 |
| WO | 2013182204 A1 | 12/2013 |

OTHER PUBLICATIONS

Leithead, W.E. et al., "A novel approach to structural load control using Intelligent Actuators," 17th Mediterranean Conference on Control and Automation (MED '9), Jun. 24-26, 2009, pp. 1257-1262.

Zhang, Y. et al., "Proportional resonant individual pitch control for mitigation of wind turbines loads," IET Renew. Power Gener. 2013, vol. 7, Issue 3, pp. 191-200 (www.ietdl.org).

* cited by examiner

METHOD AND SYSTEM FOR MANAGING LOADS ON A WIND TURBINE

BACKGROUND

Embodiments of the present disclosure are related to wind turbines, and more particularly to a system and method for controlling wind turbines.

In wind turbine control systems, cyclic pitch control also known as Rotor Imbalance Control (RIC) is used to mitigate rotor imbalance loads in a yaw axis and a nodding axis that arise due to sampling of a non-homogenous wind field by the wind turbine blades. Cyclic pitching of the blades at the static (0P), rotational (1P), and multiple (for example, 2P) frequencies facilitates reducing the energy in the 0P, 1P, and 2P frequencies in the yaw axis and nodding axis imbalance loads. The activation of this RIC is conditioned on a current power output of the wind turbine, which is correlated to the expected yaw axis and nodding axis imbalance loads at each potential power output level. As the power output transitions from a low value, for example, about 65% rated power to a higher value, for example, approximately 80% rated power, RIC transits from zero activation to full activation. This activation scheme assumes a certain monotonic relationship between the rotor imbalance loads and power output of the turbine. However, there are scenarios where this relationship is not preserved and the turbine might experience high rotor imbalance loads even at low power outputs. Such situations can be conditions of high wind shear, wind misalignment at low/medium wind speeds and extreme turbulence. In such scenarios, even though the RIC subsystem could help mitigate the rotor imbalance loads, it stays deactivated due to low power output. One possible approach to alleviate such a situation is to lower the threshold on power to activate the RIC subsystem. However, that imposes penalties on annual energy production (AEP) by pitching the blades when not needed and by adding to pitch control duty cycle.

BRIEF DESCRIPTION

In one embodiment, a computer-implemented method for managing loads on a wind turbine is implemented using a processor coupled to a memory device, the method includes determining a first moment of a wind load acting about a first axis of a rotor of the wind turbine, determining a second moment of a wind load acting about a second axis of the rotor of the wind turbine, and determining a resultant moment of the first moment and the second moment. The method also includes generating an error signal indicating a difference between the resultant moment and a predetermined moment level threshold signal and generating, by the processor, a first activation signal over a range of the generated error signal between a first zero activation signal level and a first full activation signal level.

In another embodiment, a turbine load management system includes a first sensor configured to generate a first load signal relative to a load on a rotor of the turbine in a first axis, a second sensor configured to generate a second load signal relative to a load on the rotor of the turbine in a second axis, the second axis perpendicular to the first axis, and a processor communicatively coupled to a memory device. The processor is programmed to determine a first moment of a wind load acting about a yaw axis of the rotor of the wind turbine using the first sensor, determine a second moment of a wind load acting about a nodding axis of the rotor of the wind turbine using the second sensor, and determine a resultant moment of the first moment and the second moment. The processor is further programmed to generate an error signal indicating a difference between the resultant moment and a predetermined moment level threshold signal and generate a first activation signal over a range of the generated error signal between a first zero activation signal level and a first full activation signal level.

In yet another embodiment, one or more non-transitory computer-readable storage media have computer-executable instructions embodied thereon that when executed by at least one processor cause the processor to determine a first moment of a wind load acting about a yaw axis of a rotor of the wind turbine using a first sensor, determine a second moment of a wind load acting about a nodding axis of the rotor of the wind turbine using a second sensor, and determine a resultant moment of the first moment and the second moment. The instructions further cause the at least one processor to generate an error signal indicating a difference between the resultant moment and a predetermined moment level threshold signal and generate a first activation signal over a range of the generated error signal between a first zero activation signal level and a first full activation signal level.

DRAWINGS

These and other features, aspects, and advantages of the present disclosure will become better understood when the following detailed description is read with reference to the accompanying drawings in which like characters represent like parts throughout the drawings, wherein.

Figure 1:
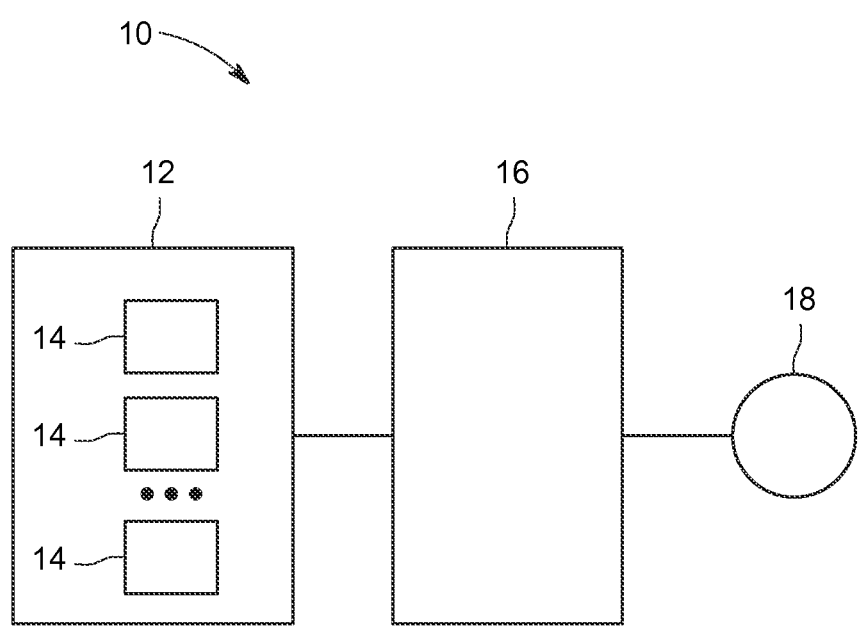
FIG. 1 is a block diagram of an exemplary power generation system that includes a power generator.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As described above, rotor imbalance controls (RIC) (cyclic pitch actuation) is used to mitigate rotor imbalance loads in a yaw axis and a nodding axis that arise due to sampling of a non-homogenous wind field by the wind turbine blades. Embodiments of the present disclosure describe augmenting the power level activation condition of RIC with an imbalanced load based activation condition for activating the RIC control loop. The measured loads used are received from proximity sensors. Such a configuration provides technical advantages over current systems, namely activation of RIC using measured loads ensures that the RIC is active when it is required rather than activation being based on a surrogate variable, such as, wind turbine power output, which may not always be an accurate surrogate for the loads, which the RIC subsystem is intended to mitigate. The measured loads activation configuration also enables loads management to facilitate reducing the impact on increase in pitch duty cycle or annual energy production (AEP) loss due to overactive RIC subsystem control when not required. The measured loads activation configuration also facilitates reducing rotor imbalance loads during conditions of shutdown during extreme yaw misalignment, extreme wind shear and extreme wind turbulence, which will result in reducing design driving loads on hub flange and tower top loads.

FIG. 1 is a block diagram of an exemplary power generation system 10 that includes a power generator 12. Power generator 12 includes one or more power generation units 14. Power generation units 14 may include, for example, wind turbines, solar cells, fuel cells, geothermal generators, hydropower generators, and/or other devices that generate power from renewable and/or non-renewable energy sources. Although three power generation units 14 are shown in the exemplary embodiment, in other embodiments, power generator 12 may include any suitable number of power generation units 14, including only one power generation unit 14.

In the exemplary embodiment, power generator 12 is coupled to a power converter 16 that is configured to convert a substantially direct current (DC) power output from power generator 12 to alternating current (AC) power. The AC power is transmitted to an electrical distribution network 18, or "grid." Power converter 16, in the exemplary embodiment, adjusts an amplitude of the voltage and/or current of the converted AC power to an amplitude suitable for electrical distribution network 18, and provides AC power at a frequency and a phase that are substantially equal to the frequency and phase of electrical distribution network 18. Moreover, in the exemplary embodiment, power converter 16 is configured to provide three phase AC power to electrical distribution network 18. Alternatively, power converter 16 can provide single phase AC power or any other number of phases of AC power to electrical distribution network 18. Furthermore, in some embodiments, power generation system 10 may include more than one power converter 16. For example, in some embodiments, each power generation unit 14 may be coupled to a separate power converter 16.

In the exemplary embodiment, power generation units 14 include one or more wind turbines 20 (shown in FIG. 2) coupled to facilitate operating power generation system 10 at a desired power output. Each wind turbine 20 is configured to generate substantially direct current power. Wind turbines 20 are coupled to power converter 16, or power converter system 16, that converts the DC power to AC power that is transmitted to the electrical distribution network 18. Methods and systems will be further described herein with reference to such a wind turbine based power generation system. However, the methods and systems described herein are applicable to any type of electric generation system.

Figure 2:
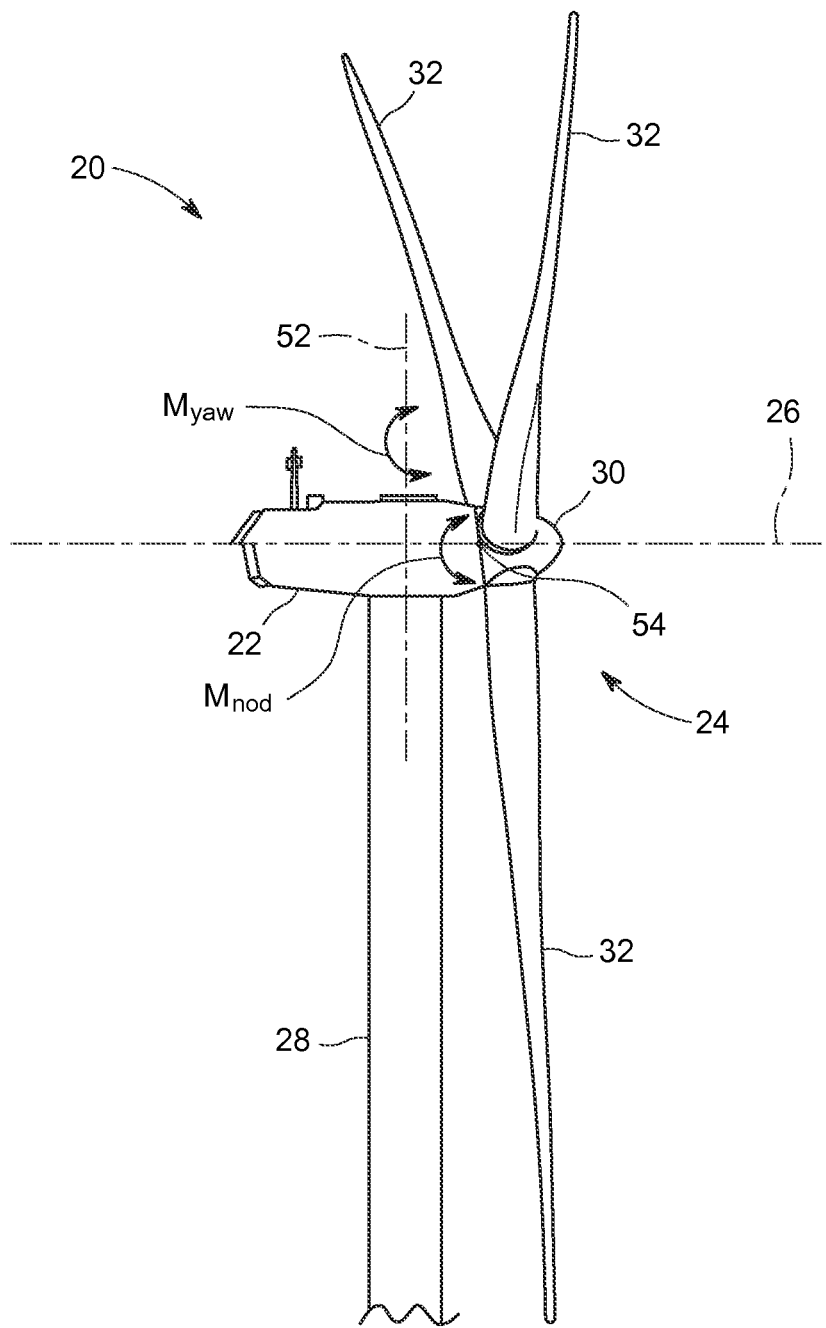
FIG. 2 is a perspective view of a wind turbine that may be used in the power generation system shown in FIG. 1.
Figure 3:
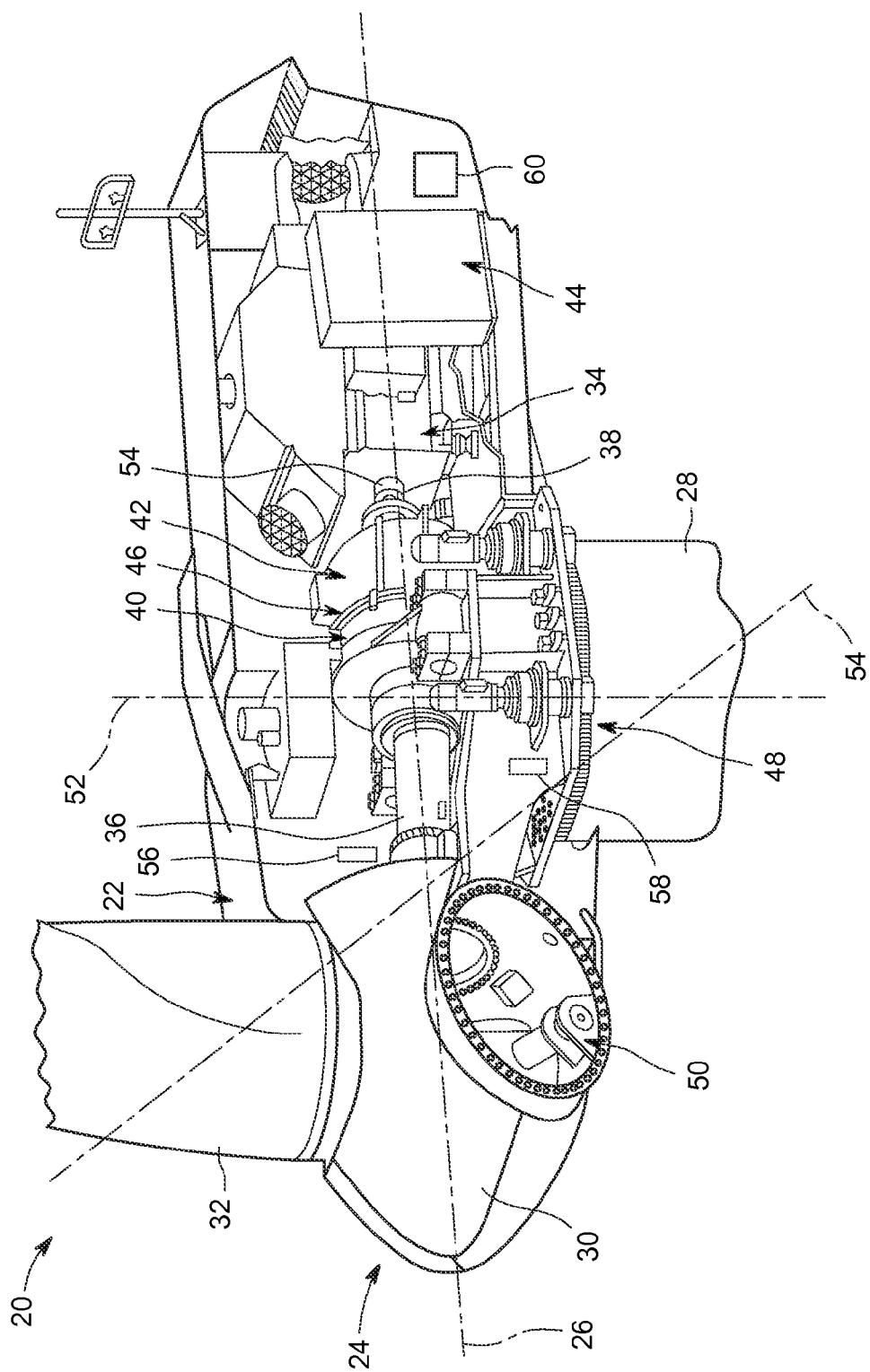
FIG. 3 is a partially cut-away perspective view of a portion of the wind turbine shown in FIG. 2.

FIG. 2 is a perspective view of wind turbine 20 (e.g., a horizontal axis wind turbine including a rotor 24 configured to rotate about a horizontal longitudinal axis 26) that may be used in power generation system 10. FIG. 3 is a partially cut-away perspective view of a portion of wind turbine 20. Wind turbine 20 described and shown herein is a wind turbine generator for generating electrical power from wind energy. Moreover, wind turbine 20 described and illustrated herein includes a horizontal-axis configuration. However, in some embodiments, wind turbine 20 may include, in addition or alternative to the horizontal-axis configuration, a vertical-axis configuration (not shown). Wind turbine 20 may be coupled to electrical distribution network 18 (shown in FIG. 1), for receiving electrical power therefrom to drive operation of wind turbine 20 and/or its associated components and/or for supplying electrical power generated by wind turbine 20 thereto. Although only one wind turbine 20 is shown in FIGS. 2 and 3, in some embodiments, a plurality of wind turbines 20 may be grouped together, sometimes referred to as a "wind farm."

Wind turbine 20 includes a body or nacelle 22 and a rotor (generally designated by 24) coupled to nacelle 22 for rotation with respect to nacelle 22 about a yaw axis of rotation 52. A yaw moment, $M_{yaw}$, acts about yaw axis of rotation 52 to tend to rotate nacelle 22 back-and-forth about yaw axis of rotation 52. A nodding moment, $M_{nod}$ acts about nodding axis 54 to tend to rotate nacelle 22 or a hub 30 about nodding axis 54, for example, in cases of a vertical wind gradient that exerts unequal force on blades 32 during an upper arc of their rotation as compared to a lower arc of their rotation about axis 26. One or more proximity sensors 56 are positioned within nacelle 22 to measure nodding moment $M_{nod}$ and one or more proximity sensors 58 are positioned within nacelle 22 to measure yaw moment $M_{yaw}$. In the exemplary embodiment, nacelle 22 is mounted on a tower 28. However, in some embodiments, in addition or alternative to tower-mounted nacelle 22, nacelle 22 may be positioned adjacent the ground (not shown) and/or a surface of water (not shown). The height of tower 28 may be any suitable height enabling wind turbine 20 to function as described herein. Rotor 24 includes a hub 30 and a plurality of blades 32 (sometimes referred to as "airfoils") extending radially outwardly from hub 30 for converting wind energy into rotational energy. Although rotor 24 is described and illustrated herein as having three blades 32, rotor 24 may have any number of blades 32. Blades 32 may each have any length that allows wind turbine 20 to function as described herein. For example, in some embodiments, one or more rotor blades 32 are about one-half meter long, while in some embodiments one or more rotor blades 32 are about fifty meters long. Other examples of blade lengths include ten meters or less, about twenty meters, about thirty-seven meters, and about forty meters. Still other examples include rotor blades between about fifty and about one-hundred meters long, and rotor blades greater than one-hundred meters long.

Wind turbine 20 includes an electrical generator 34 coupled to rotor 24 for generating electrical power from the rotational energy generated by rotor 24. Generator 34 may be any suitable type of electrical generator, such as, but not limited to, a wound rotor induction generator, a double-fed induction generator (DFIG, also known as a dual-fed asynchronous generator), a permanent magnet (PM) synchronous generator, an electrically-excited synchronous generator, and a switched reluctance generator. Generator 34 includes a generator stator (not shown in FIG. 2 or 3) and a generator rotor (not shown in FIG. 2 or 3) with an air gap included therebetween. Rotor 24 includes a rotor shaft 36 coupled to rotor hub 30 for rotation therewith. Generator 34 is coupled to rotor shaft 36 such that rotation of rotor shaft 36 drives rotation of the generator rotor, and therefore operation of generator 34. In the exemplary embodiment, generator 34 includes a generator shaft 38 coupled thereto and coupled to rotor shaft 36 such that rotation of rotor shaft 36 drives rotation of the generator rotor. In other embodiments, the generator rotor is directly coupled to rotor shaft 36, sometimes referred to as a "direct-drive wind turbine." In the exemplary embodiment, generator shaft 38 is coupled to rotor shaft 36 through a gearbox 40, although in other embodiments generator shaft 38 is coupled directly to rotor shaft 36.

The torque of rotor 24 drives the generator rotor to generate variable frequency AC electrical power from rotation of rotor 24. Generator 34 has an air gap torque between the generator rotor and generator stator that opposes the torque of rotor 24. A power conversion assembly 42 is coupled to generator 34 for converting the variable frequency AC to a fixed frequency AC for delivery to an electrical load (not shown), such as, but not limited to electrical distribution network 18 (shown in FIG. 1), coupled to generator 34. Power conversion assembly 42 may include a single frequency converter or a plurality of frequency converters configured to convert electricity generated by generator 34 to electricity suitable for delivery over the power grid. Power conversion assembly 42 may also be referred to herein as a power converter. Power conversion assembly 42 may be located anywhere within or remote to wind turbine 20. For example, power conversion assembly 42 may be located within a base (not shown) of tower 28.

In the exemplary embodiment, wind turbine 20 includes at least one system controller 44 coupled to at least one component of wind turbine 20 for generally controlling operation of wind turbine 20 and/or controlling operation of the components thereof. For example, system controller 44 may be configured to control operation of power conversion assembly 42, a disk brake 46, a yaw control system 48, and/or a variable blade pitch control system 50. Disk brake 46 brakes rotation of rotor 24 to, for example, slow rotation of rotor 24, brake rotor 24 against full wind torque, and/or reduce the generation of electrical power from electrical generator 34. Yaw control system 48 rotates nacelle 22 about yaw axis of rotation 52 for changing a yaw of rotor 24, and more specifically for changing a direction faced by rotor 24 to, for example, adjust an angle between the direction faced by rotor 24 and a direction of wind. Other sensors 60 are communicatively coupled to system controller for use in communicating such parameter values that are sensed by other sensors 60. For example, other sensors include electrical parameter measurement sensors, such as, a power output level sensor 62 configured to sense real and reactive power output of generator 34.

Furthermore, variable blade pitch control system 50 controls, including but not limited to changing, a pitch angle of blades 32 (shown in FIGS. 2-3) with respect to a wind direction. Pitch control system 50 may be coupled to system controller 44 for control thereby. Pitch control system 50 is coupled to hub 30 and blades 32 for changing the pitch angle of blades 32 by rotating blades 32 with respect to hub 30. Pitch control system 50 may include any suitable structure, configuration, arrangement, means, and/or components, whether described and/or shown herein, such as, but not limited to, electrical motors, hydraulic cylinders, springs, and/or servomechanisms. Moreover, pitch control system 50 may be driven by any suitable means, whether described and/or shown herein, such as, but not limited to, hydraulic fluid, electrical power, electro-chemical power, and/or mechanical power, such as, but not limited to, spring force.

Figure 4:
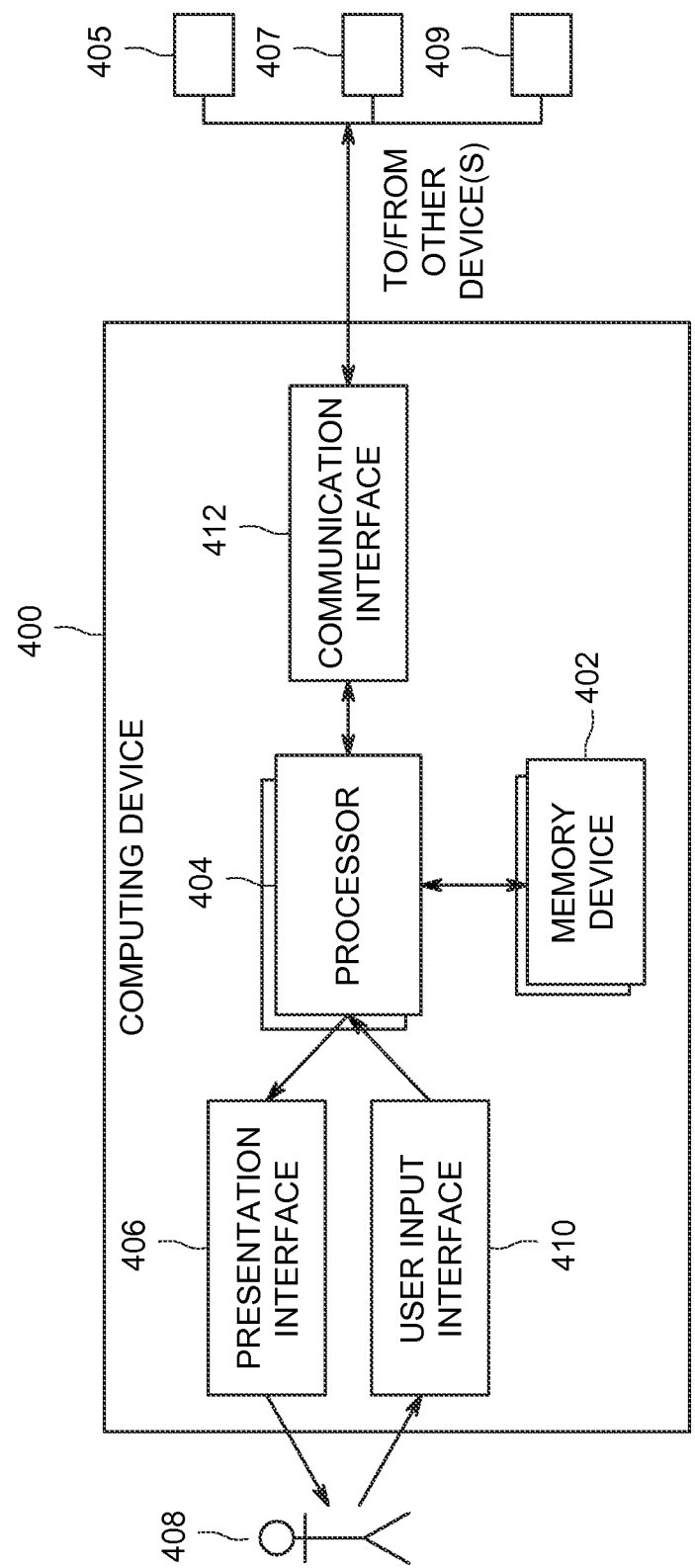
FIG. 4 is a block diagram of an exemplary computing device that may be used to monitor and/or control the operation of the wind turbine shown in FIGS. 2 and 3.

FIG. 4 is a block diagram of an exemplary computing device 400 that may be used to monitor and/or control the operation of wind turbine 20 (shown in FIGS. 2 and 3). Computing device 400 includes a memory device 402 and a processor 404 operatively coupled to memory device 402 for executing instructions. As used herein, the term "processor" includes any suitable programmable circuit such as, without limitation, one or more systems and microcontrollers, microprocessors, a general purpose central processing unit (CPU), reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

Processor 404 may include one or more processing units (e.g., in a multi-core configuration). In some embodiments, executable instructions are stored in memory device 402. Computing device 400 is configurable to perform one or more operations described herein by programming processor 404. For example, processor 404 may be programmed by encoding an operation as one or more executable instructions and providing the executable instructions in memory device 402.

In addition, in the exemplary embodiment, memory device 402 is at least one device coupled to processor 404 that enables storage and retrieval of information such as computer-executable instructions and data, including, without limitation, operating data, parameters, setpoints, threshold values, and/or any other data that enables computing device 400 to function as described herein. Memory device 402 may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 402 may be configured to store operational measurements including, without limitation, utility electric power grid voltage and current readings, substation voltage and current readings, localized voltage and current readings throughout wind turbine 20, including an auxiliary electric power system 405 and an electric power generation system 407, and/or any other type of data. In some embodiments, processor 404 removes or "purges" data from memory device 402 based on the age of the data. For example, processor 404 may overwrite previously recorded and stored data associated with a subsequent time and/or event. In addition, or alternatively, processor 404 may remove data that exceeds a predetermined time interval. Also, memory device 402 includes, without limitation, sufficient data, algorithms, and commands to facilitate centralized and distributed control of protection and control system 409 of electrical distribution network 18.

In some embodiments, computing device 400 includes a presentation interface 406 coupled to processor 404. Presentation interface 406 presents information, such as a user interface and/or an alarm, to a user 408. In one embodiment, presentation interface 406 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 406 includes one or more display devices. In addition, or alternatively, presentation interface 406 includes an audio output device (not shown) (e.g., an audio adapter and/or a speaker) and/or a printer (not shown). In some embodiments, presentation interface 406 presents an alarm associated with a synchronous machine (not shown in FIG. 1), such as by using a human machine interface (HMI) (not shown).

In some embodiments, computing device 400 includes a user input interface 410. In the exemplary embodiment, user input interface 410 is coupled to processor 404 and receives input from user 408. User input interface 410 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 406 and user input interface 410.

A communication interface 412 is coupled to processor 404 and is configured to be coupled in communication with one or more other devices, such as a sensor or another computing device 400, and to perform input and output operations with respect to such devices. For example, communication interface 412 may include, without limitation, a wired network adapter, a wireless network adapter, a mobile telecommunications adapter, a serial communication adapter, and/or a parallel communication adapter. Communication interface 412 may receive data from and/or transmit data to one or more remote devices. For example, a communication interface 412 of one computing device 400 may transmit an alarm to the communication interface 412 of another computing device 400.

Presentation interface 406 and/or communication interface 412 are both capable of providing information suitable for use with the methods described herein (e.g., to user 408 or another device). Accordingly, presentation interface 406 and communication interface 412 may be referred to as output devices. Similarly, user input interface 410 and communication interface 412 are capable of receiving information suitable for use with the methods described herein and may be referred to as input devices.

Figure 5:
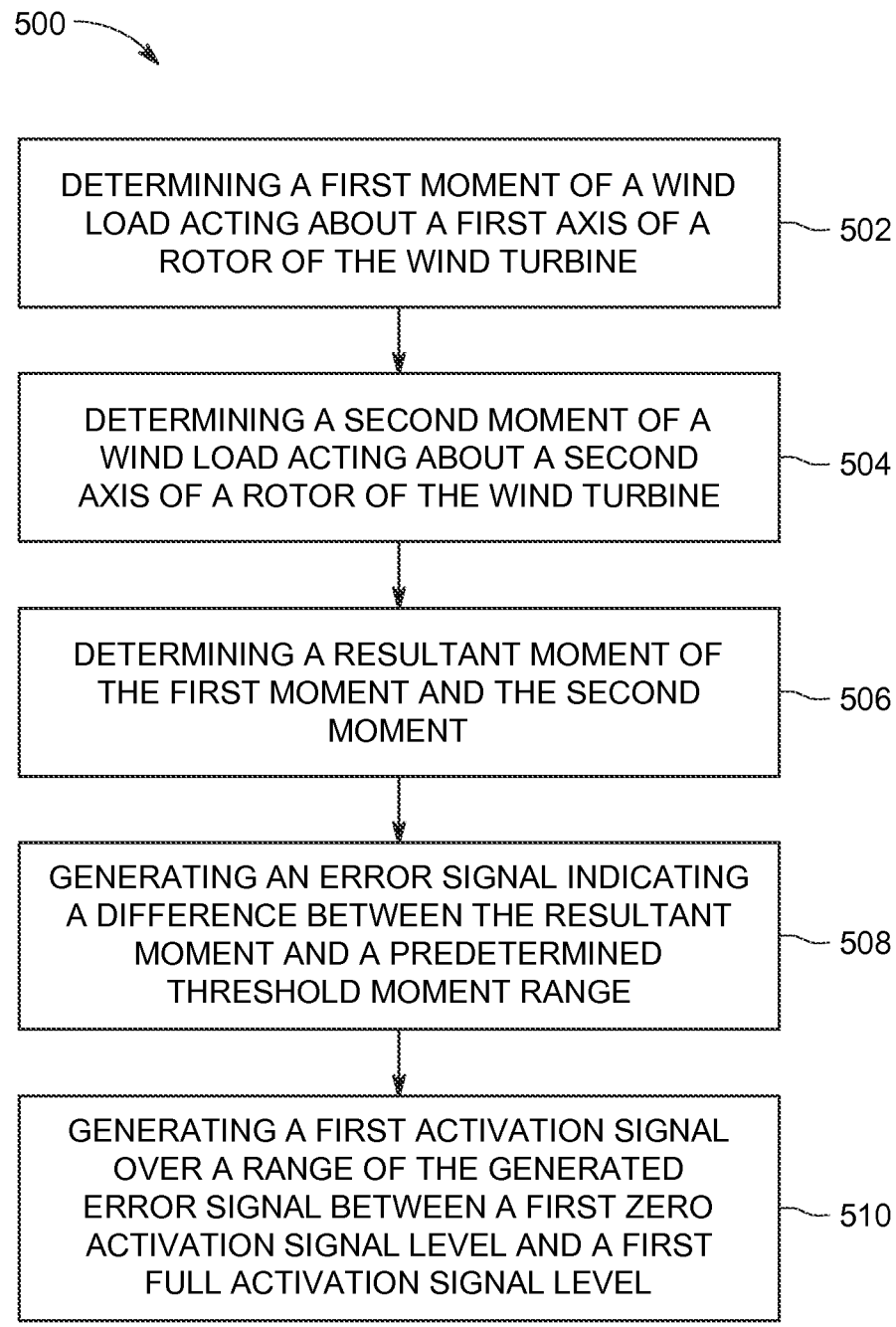
FIG. 5 is a flow diagram of a computer-implemented method for managing loads on the wind turbine shown in FIG. 2.
Figure 6:
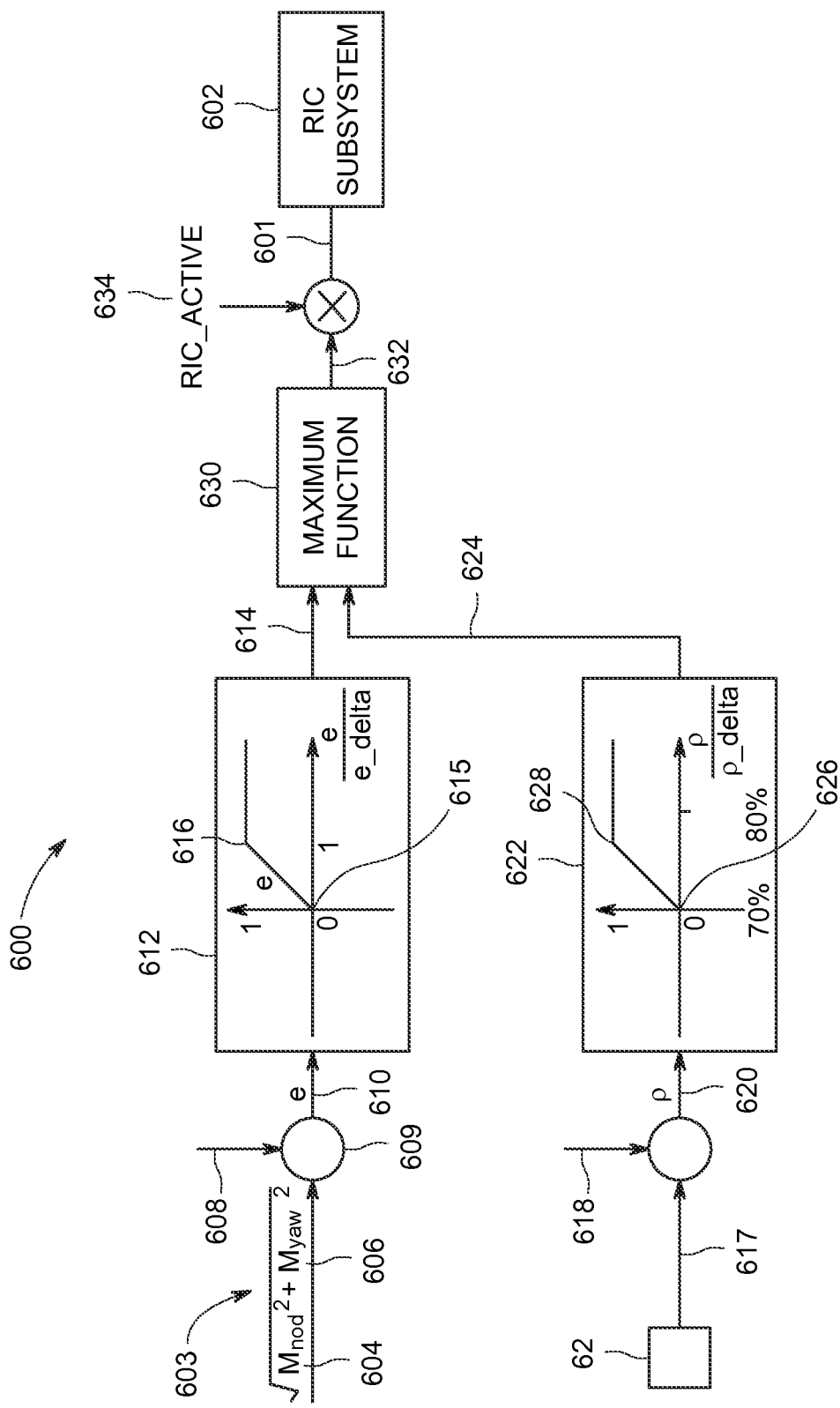
FIG. 6 is a data flow diagram of a rotor imbalance control (RIC) activation subsystem that may be used with the wind turbine shown in FIG. 2.

FIG. 5 is a flow diagram of a computer-implemented method 500 for managing loads on wind turbine 20 shown in FIG. 2. FIG. 6 is a data flow diagram of a rotor imbalance control (RIC) activation subsystem 600 that may be used with wind turbine 20 (shown in FIG. 2). In the exemplary embodiment, method 500 is implemented using processor 404 shown in FIG. 4 coupled to memory device 402 shown in FIG. 4. Method 500 includes determining 502 a nodding moment ($M_{nod}$) 604 of a wind load acting about nodding axis 54 of rotor 24 of wind turbine 20, determining 504 a yaw moment ($M_{yaw}$) 606 of a wind load acting about yaw axis of rotation 52 of rotor 24 of wind turbine 20, and determining 506 a moment resultant vector signal 603 of $M_{nod}$ 604 and $M_{yaw}$ 606. Method 500 further includes generating 508 a loads error signal 610 indicating a difference between moment resultant vector signal 603 and a predetermined moment level threshold signal 608 and generating 510 a first activation signal 614 over a range of loads error signal 610 between a first zero activation signal level 615 and a first full activation signal level 616. Method 500 further includes generating a wind load signal using an electrical load of the wind turbine.

In the exemplary embodiment, RIC activation subsystem 600 is configured to generate an RIC activation signal 601 that is applied to an RIC subsystem 602 to control an amount by which RIC subsystem 602 controls a pitch of blades 32 of wind turbine 20. RIC activation subsystem 600 is configured to receive a moment resultant vector signal ($\sqrt{M_{nod}^2+M_{yaw}^2}$) 603 relative to current values of a nodding moment ($M_{nod}$) 604 and a yaw moment ($M_{yaw}$) 606. Nodding moment ($M_{nod}$) 604 and yaw moment ($M_{yaw}$) 606 are signals derived from proximity sensors positioned proximate rotor 24. Moment resultant vector signal 603 is compared to moment level threshold signal 608 at summing junction 609 to generate a loads error signal 610, which is input to a loads error function block 612 of loads error signal 610 with respect to an error delta value, which is a selectable value used to establish a slope of loads error function block 612. Loads error function block 612 generates first activation signal 614 that varies between for example, first zero activation signal level 615 that does not activate RIC subsystem 602 to first full activation signal level 616 that fully activates RIC subsystem 602, where the second value is larger than the first value. In the exemplary embodiment, first activation signal 614 varies between a zero level and a one level, which is embodied as a voltage, current, or frequency signal or a percentage thereof. Between the first value and the second value, RIC subsystem 602 may be partially active, meaning RIC subsystem 602 is limited to controlling pitch to less than its full capability.

Similarly, power level sensor 62 provides a power level signal 617 indicative of an electrical power output level of wind turbine 20. Power level signal 617 is used as a surrogate for measured wind load on wind turbine 20. Power level signal 617 is received and compared to a power level threshold signal 618 to generate a power error signal 620, which is input into a power error function block 622. Power error function block 622 generates a second activation signal 624 that is a function of power error signal 620 divided by a power delta value, which is selectable by a user. Power error function block 622 generates a second activation signal 624 that varies between for example, a first value that does not activate RIC subsystem 602 to a second value that fully activates RIC, where the second value is greater than the first value. In the exemplary embodiment, second activation signal 624 varies between a zero level 626 and a one level 628, which is embodied as a voltage, current, or frequency signal or a percentage thereof. First and second activation signals 614 and 624 are input to a maximum function block 630 configured to select a larger 632 of first and second activation signals 614 and 624 to be applied to RIC subsystem 602. A manual RIC select 634 is also provided to control activation of RIC subsystem 602 manually. An RIC activation signal 601 is applied to RIC subsystem 602.

In various embodiments, loads error function block 612 and power error function block 622 are operated independently or in the absence of the other. For example, if loads error function block 612 is used alone to provide the RIC activation signal, maximum function block 630 would not be needed and first activation signal 614 would essentially function as RIC activation signal 601. Similarly, if power error function block 622 is used alone to provide the RIC activation signal, maximum function block 630 would not be needed and second activation signal 624 would essentially function as RIC activation signal 601.

The above-described embodiments of a method and system of activating a rotor imbalance control (RIC) subsystem provides a cost-effective and reliable means for activating the RIC subsystem using measured loads experienced by the turbine rotor. The embodiments described herein use a measured load based RIC activation system to facilitate accurate real-time operation of the RIC subsystem during periods when the electrical load on the turbine generator is not an accurate surrogate for the moment loads on the turbine rotor. Specifically, the embodiments described herein use proximity sensors mounted about the wind turbine to generate signals indication of actual loads experienced by the wind turbine in real time. Therefore, the embodiments described herein substantially improve the accuracy of RIC activation without operating the RIC subsystem when it is not necessary, thereby reducing the costs of operation and maintenance.

An exemplary technical effect of the methods, systems, and apparatus described herein includes at least one of: (a) determining a first moment of a wind load acting about a first axis of a rotor of the wind turbine, (b) determining a second moment of a wind load acting about a second axis of a rotor of the wind turbine, (c) determining, by the processor, a resultant moment of the first moment and the second moment, (d) generating, by the processor, an error signal indicating a difference between the resultant moment signal and a predetermined moment level threshold signal; and (e) generating, by the processor, a first activation signal over a range of the generated error signal between a first zero activation signal level and a first full activation signal level.

Exemplary embodiments of methods, systems, and apparatus for activating a wind turbine rotor imbalance control subsystem are not limited to the specific embodiments described herein, but rather, components of systems and/or steps of the methods may be utilized independently and separately from other components and/or steps described herein. For example, the methods may also be used in combination with other systems requiring alternate activation systems and the associated methods, and are not limited to practice with only the wind turbine monitoring and control systems and methods as described herein. Rather, the exemplary embodiment can be implemented and utilized in connection with many other applications, equipment, and systems that may benefit from alternate activation methods of control systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for managing loads on a wind turbine, the method implemented using a processor coupled to a memory device, the method comprising:
   determining, by the processor, at least one of a first moment of a wind load acting about a first axis of a rotor of the wind turbine and a second moment of the wind load acting about a second axis of the rotor of the wind turbine;
   determining, by the processor, a resultant moment of the at least one of the first moment and the second moment;
   generating, by the processor, a loads error signal indicating a difference between the resultant moment and a predetermined moment level threshold signal;
   generating, by the processor, a first activation signal over a range of the loads error signal between a first zero activation signal level and a first full activation signal level;
   generating, by the processor, a wind load signal using an electrical load of the wind turbine;
   generating, by the processor, a power error signal indicating a difference between the electrical load of the wind turbine and a predetermined power level threshold signal;
   generating, by the processor, a second activation signal over a range of the power error signal between a second zero activation signal level and a second full activation signal level; and
   controlling a pitch of one or more blades on the wind turbine, by the processor, by activating a rotor imbalance control (RIC) circuit using a maximum of the first activation signal and the second activation signal.

2. The computer-implemented method of claim 1, wherein determining the moment acting about the first axis of a rotor of the wind turbine comprises determining a moment acting about a yaw axis of the rotor.

3. The computer-implemented method of claim 2, wherein determining the moment acting about the yaw axis of the rotor comprises using a proximity sensor to measure a force acting about the yaw axis of the rotor.

4. The computer-implemented method of claim 1, wherein determining the moment acting about the second axis of a rotor of the wind turbine comprises determining a moment acting about a nodding axis of the rotor.

5. The computer-implemented method of claim 4, wherein determining the moment acting about the nodding axis of the rotor comprises using a proximity sensor to measure a force acting about the nodding axis of the rotor.

6. The computer-implemented method of claim 1, wherein generating the second activation signal over the range of the generated power error signal between the second zero activation signal level and the second full activation signal level comprises generating the second activation signal over a range of the power error signal between the second zero activation signal level based on a first value of rated turbine load and a second full activation signal level based on a second value of rated turbine load, wherein the second value of rated turbine load is greater than the first value of rated turbine load.

7. A wind turbine load management system comprising:
   one or more sensors configured to generate at least one of a first load signal relative to a load on a rotor of the wind turbine in a first axis and to generate a second load signal relative to a load on a rotor of the wind turbine in a second axis, the second axis perpendicular to the first axis; and
   a processor communicatively coupled to a memory device, the processor programmed to:
      determine a resultant moment of the at least one of the first load signal relative to a load on a rotor of the wind turbine and the second load signal relative to the load on the rotor of the wind turbine;
      generate a loads error signal indicating a difference between the resultant moment and a predetermined moment level threshold signal;
      generate a first activation signal over a range of the loads error signal between a first zero activation signal level and a first full activation signal level;
      receive an indication of an electrical load of the wind turbine;
      generate a power error signal indicating a difference between the electrical load of the wind turbine and a predetermined power level threshold signal;
      generate a second activation signal over a range of the power error signal between a second zero activation signal level and a second full activation signal level; and
      control a pitch of one or more blades on the wind turbine, by activating a rotor imbalance control circuit using a maximum of the first activation signal and the second activation signal.

8. The wind turbine load management system of claim 7, wherein said processor is further programmed to:
   determine a first moment of a wind load acting about a yaw axis of a rotor of the wind turbine using the one or more sensors;
   determine a second moment of a wind load acting about a nodding axis of a rotor of the wind turbine using the one or more sensors; and
   determine a resultant moment of the at least one of the first moment and the second moment.

9. The wind turbine load management system of claim 7, wherein said processor is further programmed to generate the second activation signal over a range of the power error signal between a second zero activation signal level of 65% of rated wind turbine load and a second full activation signal level of 80% of rated wind turbine load.

10. The wind turbine load management system of claim 7, wherein at least one of the one or more sensors is a proximity sensor.

11. One or more non-transitory computer-readable storage media having computer-executable instructions embodied thereon, wherein when executed by at least one processor, the computer-executable instructions cause the processor to:
   determine at least one of a first moment of a wind load acting about a yaw axis of a rotor of the wind turbine and a second moment of a wind load acting about a nodding axis of a rotor of the wind turbine using a first sensor;

determine a resultant moment of the at least one of the first moment and the second moment;

generate a loads error signal indicating a difference between the resultant moment and a predetermined moment level threshold signal; and generate a first activation signal over a range of the loads error signal between a first zero activation signal level and a first full activation signal level;

receive an indication of an electrical load of the wind turbine;

generate a power error signal indicating a difference between the electrical load of the wind turbine and a predetermined power level threshold signal;

generate a second activation signal over a range of the power error signal between a second zero activation signal level and a second full activation signal level; and control a pitch of one or more blades on the wind turbine, by activating a rotor imbalance control circuit using a maximum of the first activation signal and the second activation signal.

12. The one or more non-transitory computer-readable storage media of claim 11, wherein the computer-executable instructions further cause the processor to generate a second activation signal over a range of the generated power error signal between a second zero activation signal level of greater than 50% of rated wind turbine load and a second full activation signal level of less than 90% of rated wind turbine load.

* * * * *